United States Patent [19]

Crankshaw et al.

[11] 4,337,108

[45] Jun. 29, 1982

[54] LABEL APPLICATOR WITH OSCILLATING LABEL RECEIVER AND METHOD

[75] Inventors: Michael Crankshaw, Santa Fe Springs; Leo Kucheck, Irvine, both of Calif.

[73] Assignee: Label-Aire Inc., Fullerton, Calif.

[21] Appl. No.: 199,181

[22] Filed: Oct. 29, 1980

[51] Int. Cl.[3] ....................... B32B 31/00; B65H 25/00; B44C 1/00; B65H 17/36; B65C 1/02

[52] U.S. Cl. .................................... 156/285; 156/238; 156/249; 156/344; 156/361; 156/542; 156/235; 226/158; 221/73

[58] Field of Search ............... 156/540, 541, 542, 528, 156/556, 574, 581, 358, 230, 235, 238, 249, 361, 247, 344, DIG. 30, DIG. 38, DIG. 31, DIG. 42, DIG. 1, DIG. 2, DIG. 33, DIG. 47, DIG. 48, 285; 226/143, 160, 167, 158, 4, 5; 53/51; 493/376

[56] References Cited

U.S. PATENT DOCUMENTS 4,255,220 3/1981 Kucheck et al. .................... 156/249

4,264,400 4/1981 Breitmar ............................ 156/285

FOREIGN PATENT DOCUMENTS 940208 10/1963 United Kingdom ................ 156/542

*Primary Examiner*—Edward C. Kimlin

*Assistant Examiner*—Louis Falasco

*Attorney, Agent, or Firm*—Gordon L. Peterson

[57] ABSTRACT

A label applicator comprising a supporting structure, a label receiver mounted on the supporting structure for oscillatory movement about a pivot axis between a retracted position and an extended position, and a label dispenser for supplying labels to the label receiver when the label receiver is in the retracted position. The label receiver releasably retains the labels supplied to the label receiver in the retracted position. The label receiver is moved in one direction about the pivot axis to the extended position and in that position, applies the label to an article. The label receiver is then pivoted about the pivot axis in the other direction to return it to the retracted position.

12 Claims, 4 Drawing Figures

LABEL APPLICATOR WITH OSCILLATING LABEL RECEIVER AND METHOD

BACKGROUND OF THE INVENTION

One common form of label applicator includes a fixed vacuum box or label receiver which uses vacuum pressure to releasably retain a label in position for subsequent application to an article. At the appropriate moment, the label is transferred to the article by a blast of air under pressure or by mechanical movement which presses or tamps the label onto the article. Label applicators of this type are shown, by way of example, in French et al U.S. Pat. No. 3,729,362.

For at least some labeling applications, it is desirable to move the label after it has been supplied to the label receiver and prior to the instant at which the transfer of the label from the label receiver to the article begins. For example, it is known to use drums rotated unidirectionally to transfer various forms of sheet stock from one position to another, and constructions of this type are shown, by way of example, in Rudszinat et al U.S. Pat. No. 3,250,278, Paxton et al U.S. Pat. No. 3,910,811, Cohn U.S. Pat. No. 4,003,780, McDavid et al U.S. Pat. No. 3,938,698, Helm U.S. Pat. No. 3,957,570, Radzins U.S. Pat. No. 3,772,120, Zimpel U.S. Pat. No. 2,668,632 and Hottendorf U.S. Pat. No. 3,684,627. However, drums are not as effective as desired in breaking label strings and they are somewhat more expensive than is desired. Drums with flat faces cannot get as close to the product to be labeled as desired and drums with a cylindrical contour do not hold the label parallel to the surface to be labeled.

Our U.S. Pat. No. 4,210,484 discloses a label applicator which utilizes multiple movable label receivers for the purpose of spreading labels. Finally, our copending application Ser. No. 9,276 now U.S. Pat. No. 4,255,220 discloses a label applicator in which the label receiver is linearly reciprocable between retracted and extended positions. The label receiver receives the label when it is in the retracted position and then the label receiver is moved along a linear path to an extended position. This movement breaks any label strings that attach the label to the web or strip from which it was peeled. In addition, this label movement gets the label closer to the product for ultimate air-blast transfer to the product and provides physical clearance from the peeler bar. When the article to be labeled arrives at the labeling station, the label is blown from the label receiver onto the article.

SUMMARY OF THE INVENTION

This invention relates to an improvement of the concept disclosed in our copending U.S. patent application referred to above. With this invention, the label receiver is oscillated rather than reciprocated between the retracted and extended positions. This improvement provides a number of important advantages. For example, the oscillatory motion can be carried out much faster than the reciprocatory movement disclosed in the specific embodiment of our co-pending application. This increases the speed of the labeling operation and can result in the use of less air if an air-powered actuator is utilized to drive the label receiver. In addition, the guide rods necessary to mount the label receiver for reciprocation are eliminated. This not only eliminates structure, but enables optimizing of the label receiver as described hereinbelow.

Oscillating the label receiver speeds up the labeling operation because this enables portions of the moving mass to be on opposite sides of the pivot axis. Preferably, the pivot axis extends through the center of mass which is oscillated about the pivot axis. In addition, by appropriately using the levers provided as a result of mounting the label receiver for pivotal or oscillatory movement, the effective length of the input motion can be less than the effective length of the output motion of the label receiver. Thus, the stroke of the drive member, which may be, for example, a linear actuator, a cam, etc., is reduced. This also contributes to the speed of operation of the label applicator.

In a preferred construction, the label applicator includes a supporting structure, a pivot arm mounted on the supporting structure of pivotal movement about a pivot axis and a label receiver carried by the pivot arm. Label dispensing means is mounted on the supporting structure and supplies labels to the label receiver when the latter is in the retracted position. The label receiver includes means, such as vacuum retention means, for releasably retaining the label. The label receiver is movable between the retracted and extended positions by a suitable drive member. Although the label receiver could tamp, i.e., press the label onto the article, preferably label transfer is accomplished by an air blast and without using the label receiver to tamp on the label. Passage means is provided in the label receiver for transmitting the blast of gas to the label when the label receiver is in the extended position.

The label receiver has a face on which the label is releasably held. The angular orientation of this face changes as the label receiver pivots about the pivot axis. Preferably, the label receiver face lies in a plane that will result in the blast of gas forcing the label directly toward the article to be labeled. For example, if the surface to be labeled is horizontal, the label receiver face is preferably horizontal in the extended position. This means that the label receiver face will be non-horizontal in the retracted position.

The invention, together with further features and advantages thereof, may best be understood by reference to the following description taken in connection with the accompanying illustrative drawings.

BRIEF DESCRIPTION OF THE DRAWINGS

In FIG. 1, the label receiver is in the retracted position.

DESCRIPTION OF THE PREFERRED EMBODIMENT

Figure 1:
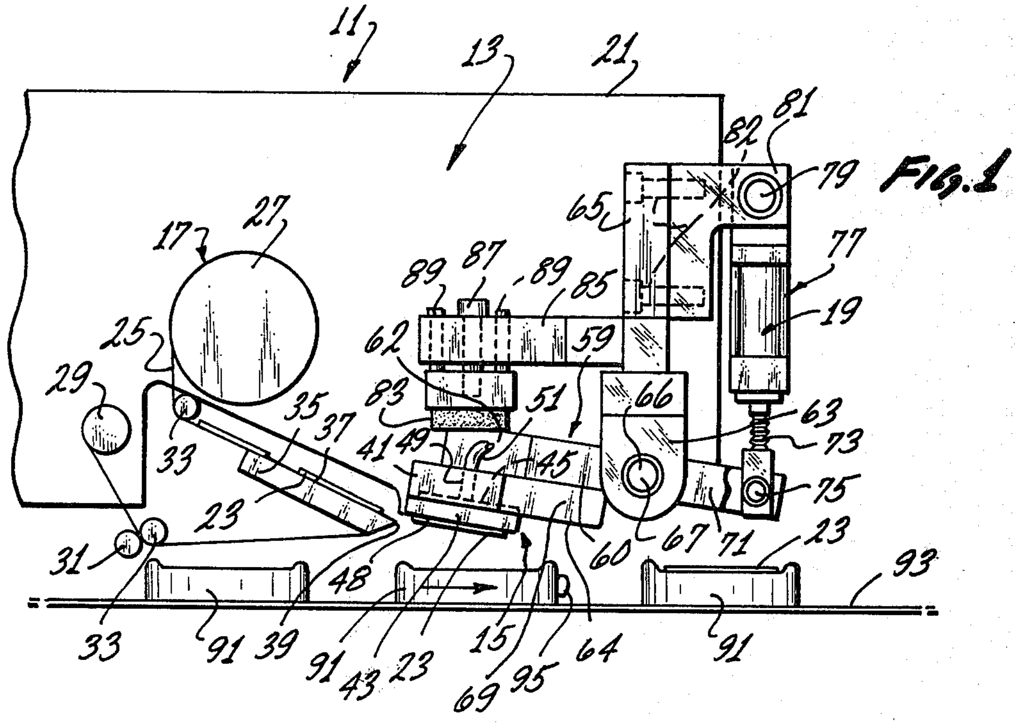
FIG. 1 is a partially schematic side elevational view of a label applicator constructed in accordance with the teachings of this invention and being utilized to apply labels to articles.
Figure 2:
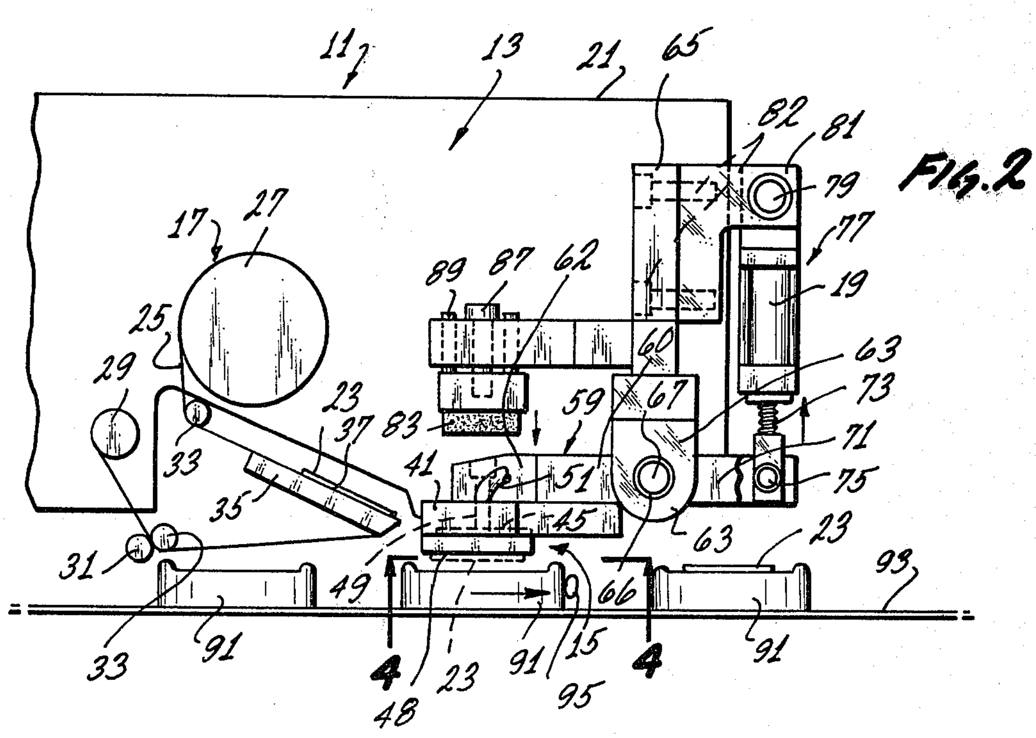
FIG. 2 is a view similar to FIG. 1 with the label receiver being in the extended position.

FIG. 1 shows a label applicator 11 which generally comprises a supporting structure 13, a label receiver 15, a label dispenser 17 and a pneumatic linear actuator 19 for pivoting the label receiver between a retracted position shown in FIG. 1 and an extended position shown in FIG. 2. The supporting structure 13, which may be of essentially conventional construction, includes a support plate 21.

Various forms of label dispensers can be utilized to sequentially supply labels to the label receiver 15, and the dispenser 17 is merely illustrative. The dispenser 17 is adapted to be used with labels 23 which are releasably adhered to a web or backing strip 25 by an adhesive. The dispenser 17 includes a supply reel 27 rotatably mounted on the supporting structure 13 and carrying a row of the labels, 23, a take-up reel 29 rotatably mounted on the supporting structure 13, a drive roller 31 for driving the web 25 from the supply reel to the take-up reel, a suitable number of idler rollers 33 and a peeler bar 35 mounted on the supporting structure.

The peeler bar 35 has a peeler bar face 37 and a peeling edge 39, and the web 25 is pulled in sequence across the face 37 and the peeling edge 39 so as to remove the labels 23 from the web 25 in a well-known manner. Although the label applicator 11 could be arranged in various different orientations, in the embodiment illustrated, the peeler bar face 37 is inclined with respect to the horizontal, such as at a 22½ degree angle.

Figure 3:
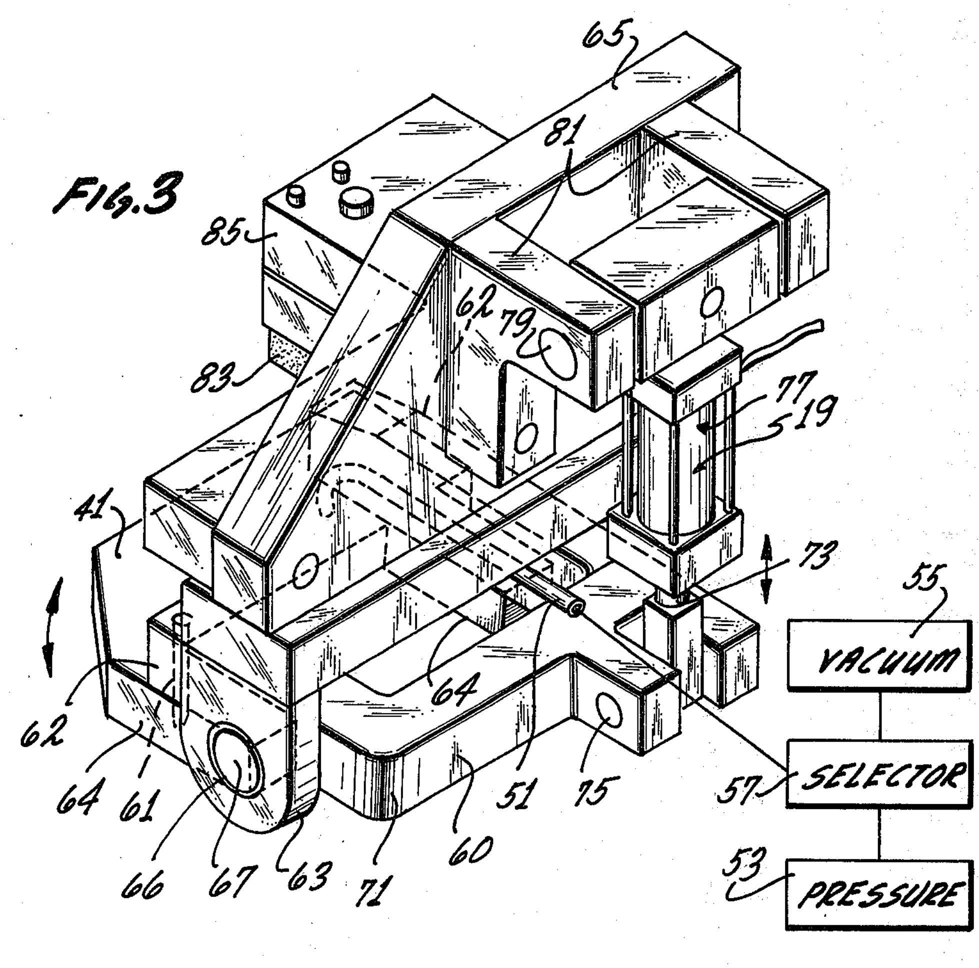
FIG. 3 is a perspective view of the label receiver and the associated structure for mounting and pivoting the label receiver.
Figure 4:
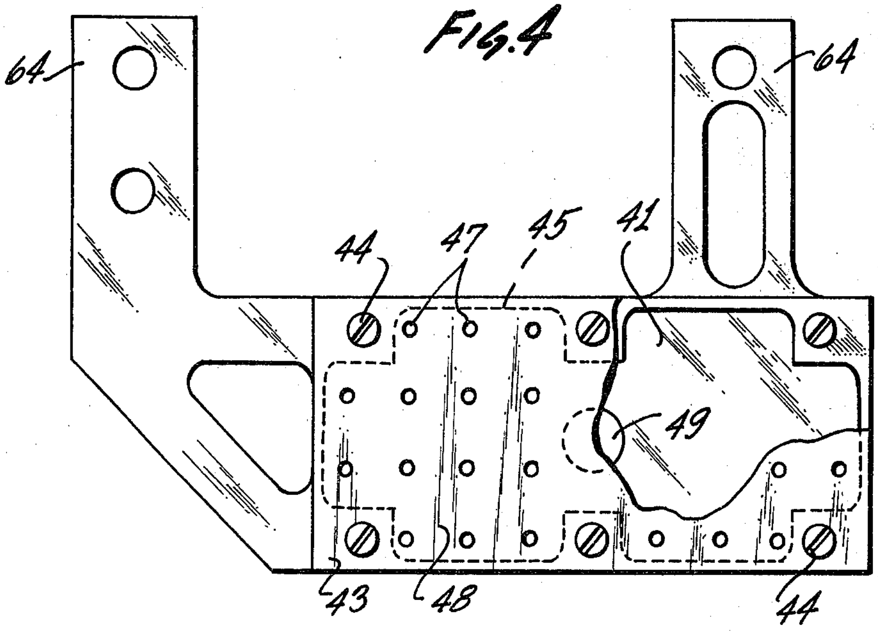
FIG. 4 is a plan view with parts broken away of one form of label receiver and pivot arm which can be used with this invention.

Although the label receiver 15 can be of various different constructions, in the embodiment illustrated, it includes a body section 41 (FIGS. 1 and 4) having a recess therein and a cover plate 43 suitably attached to the body section as by screws 44 and defining therewith a cavity 45. The cover plate 43 includes passage means in the form of a plurality of openings or passages 47 (FIG. 4) which extend completely through the cover plate and open at a label receiver face 48. The body section 41 has a central opening 49 of larger diameter than the passages 47 which also leads to the cavity 45. The opening 49 is coupled by means of a conduit 51 (FIG. 3) to sources of fluid under pressure 53 and a source of vacuum 55 through a selector 57. The selector 57 alternately couples the opening 49 to the sources 53 and 55 in a well-known manner so that the cavity 45 and hence the passages 47 can selectively provide vacuum pressure to retain one of the labels 23 on the cover plate 43 or fluid under pressure to transfer the label from the cover plate. Alternatively, the cavity 45 can be subjected to pressure and vacuum conditions through separate connections to the label receiver 15 or in the manner disclosed in Reich U.S. Pat. No. 3,093,528.

The label receiver 15 is mounted on the support plate 21 for pivotal movement by a pivot arm. Although the pivot arm 59 can be of different constructions, in the embodiment illustrated, it includes a yoke 60 and the body section 41 which have a pair of legs 62 and 64, respectively, which are joined by one or more screws 61. The pivot arm 59 is pivotally mounted on a channel 63 which is suitably mounted on the support plate 21 by a bracket 65. As shown in FIG. 1, a shaft 66 mounts the pivot arm 59 at the yoke 60 for pivotal movement about a pivot axis 67, and portions of the pivot arm 59 lie on opposite sides of the pivot axis 67 to define lever arms 69 and 71, respectively.

The actuator 19 includes a rod 73 (FIGS. 1 and 3) which is pivotally attached to the lever arm 71 by a pin 75. The actuator 19 also includes a housing 77 which is pivotally mounted by a shaft 79 to a pair of brackets 81 which are in turn rigidly attached to the bracket 65 by screws 82. This enables the actuator 19 to extend to thereby retract the label receiver 15 to the position of FIG. 1 and to retract to move the label receiver to the extended position of FIG. 2.

In the retracted position of FIG. 1, an extension of one of the legs 62 of the yoke 60 engages a resilient stop in the form of a resilient pad 83 which is adjustably coupled to a fixed arm 85 carried by the bracket 65, by an adjusting screw 87 and dowels 89. This provides some adjustment in the location of the label receiver 15 in the retracted position. In the orientation illustrated, in the retracted position, the label receiver face 48 is inclined from the horizontal at about 7½ degrees and in the extended position, the face 48 is horizontal.

The label applicator 11 is adapted to rapidly apply labels to the upper surfaces of articles 91 conveyed through a labeling station immediately beneath the label receiver 15 by a conveyor 93. In use, the actuator 19 normally holds the label receiver 15 in the extended position shown in FIG. 2. A previously dispensed label 23 is held on the cover plate 43 by vacuum pressure provided to the passages 47 via the cavity 45, the central opening 49, the conduit 51 and the vacuum source 55. In the extended position, the label receiver face 48 is horizontal and parallel to the upper surface of the article 91 on which the label is to be applied.

As one of the articles 91 approaches the labeling station, its presence is sensed in a conventional manner by a sensor 95 whereupon the selector 57 provides communication between the source of pressure 53 and the cavity 45 of the label receiver to consequently blow the label 23 from the label receiver face 48 onto the upper surface of the article 91 at the labeling station. The label receiver does not mechanically press the label 23 against the article 91. The transfer of the label 23 to the article is accomplished entirely by the blast of air. After a predetermined time period, the actuator 19 is automatically energized to pivot the label receiver 15 in the opposite direction about the pivot axis 67 to return the label receiver to the retracted position. As soon as the retracted position is reached, the label dispenser 17 automatically dispenses a new label 23 onto the label receiver 15, and the actuator 19 again pivots the label receiver to the extended position of FIG. 2 to await the arrival of another article 91 at the labeling station. The label applicator of this invention can label randomly spaced articles, and accordingly, the period of dwell of the label receiver 15 in the extended position is a function of the spacing between articles 91. Thus, the rate of oscillation of the label receiver is a function of article spacing and speed. The length of movement of the label receiver 15 in moving to the extended position is sufficient to break any label strings to provide physical clearance from the peeler bar 35, and to move the label receiver face 48 quite close to the upper surface of the article to be labeled at the labeling station.

Although the upper surface of the articles 91 is recessed in the form shown in FIGS. 1 and 2, this is purely illustrative as the surface to be labeled need not be recessed. The controls for sequencing the movements of the label applicator 11 are conventional and the sequence of operation may be varied by those having ordinary skill in the label applicator art.

Although an exemplary embodiment of the invention has been shown and described, many changes, modifications and substitutions may be made by one having ordinary skill in the art without necessarily departing from the spirit and scope of this invention.

We claim:

1. A label applicator comprising:

a supporting structure;

a label receiver;

means for mounting said label receiver on the supporting structure for movement in both directions about a pivot axis between a retracted position and an extended position;

label dispensing means for supplying at least one label to the label receiver when the label receiver is in said retracted position;

said label receiver including means for releasably retaining the label supplied to the label receiver by the label dispensing means;

means for moving said label receiver in both directions about said pivot axis between said retracted position and said extended position; and passage means in said label receiver for transmitting a blast of gas to the label on the label receiver at least when the label receiver is in the extended position to transfer the label on the label receiver to an article.

2. A label applicator as defined in claim 1 wherein said moving means moves a shorter distance than the central region of the label receiver when the label receiver travels between said positions thereof.

3. A label applicator as defined in claim 1 wherein the mounting means includes a pivot arm mounted on the supporting structure for pivotal movement about said pivot axis, said label receiver being carried by the pivot arm.

4. A label applicator as defined in claim 3 wherein the moving means includes a drive member drivingly coupled to the pivot arm at a location spaced from the pivot axis such that said location moves a shorter distance than the central region of the label receiver when the label receiver travels between said positions thereof.

5. A label applicator as defined in claim 1 or 4 wherein a mass is pivoted as the label receiver is pivoted between said positions thereof with portions of said mass lying on opposite sides of said pivot axis whereby the inertia of said mass is less than if the mass were entirely on one side of the pivot axis.

6. A label applicator as defined in claim 5 wherein the pivot axis extends generally through the center of said mass.

7. A label applicator as defined in claim 1 wherein the label applicator is adapted to apply labels supplied on a strip, said label dispensing means includes a peeler bar mounted on the supporting structure and having a peeler bar face and a peeling edge, said label dispensing means including means for moving the strip across the peeler bar face and then over the peeling edge to remove labels from the strip, said peeler bar face being inclined with respect to the horizontal, said label receiver having a face with said passage means terminating in said face, said label receiver face being generally horizontal in the extended position.

8. A label applicator as defined in claim 1 or 4 wherein the label receiver has a face with said passage means terminating in said face, said face being generally horizontal in the extended position and non-horizontal in the retracted position.

9. A label applicator as defined in claim 1 wherein said label receiver includes an enclosure having first and second generally opposite walls portions, said passage means includes a plurality of openings in said first wall portion, said second wall portion having a central aperture therein communicating with said openings through said enclosure, said aperture being adapted to be coupled to a source of gas under pressure and a vacuum source whereby the labels can be selectively releasably retained on the label receiver and transferred from the label receiver.

10. A label applicator as defined in claim 1 including resilient stop means for at least assisting in defining the retracted position of the label receiver.

11. A label applicator as defined in claim 3 wherein the moving means includes a linear actuator drivingly coupled to the supporting structure and to the pivot arm at a location spaced from the pivot axis.

12. A method for supplying a label to a surface of an article comprising:

moving the article to be labeled through a label applying station;

providing a label receiver having a label receiving face and passage means opening at said face;

supplying a label to a label receiving face of the label receiver when the label receiver is in a first position;

applying reduced pressure to the passage means of the label receiver which is sufficient to releasably retain the label on the label receiving face of the label receiver;

pivoting the label receiver in one direction about a pivot axis from the first position toward the label applying station to a label applying position in which the label receiving face of the label receiver is spaced from the article as the article is moved through the label applying station, the label receiving face of the label receiver being substantially closer to the article in the label applying position than in the first position when the article is moved through the label applying station;

applying a blast of gas through the passage means of the label receiver and against the label on the label receiving face of the label receiver to remove the label from the label receiving face when the label receiver is in the extended position and to transfer the label to the surface of the article at the labeling station without pressing the label against the article with the label receiver; and pivoting the label receiver in a second direction about said pivot axis to the first position, said second direction being opposite to the first direction whereby the label receiver moves in both directions about said pivot axis.

* * * * *